United States Patent [19]
Hiereth et al.

[11] Patent Number: 5,729,978
[45] Date of Patent: Mar. 24, 1998

[54] SUPERCHARGED INTERNAL COMBUSTION ENGINE WITH CAPABILITY FOR MECHANICAL STEP-UP DRIVE OF AN EXHAUST GAS TURBOCHARGER

[75] Inventors: Herman Hiereth, Esslingen; Harald Däuble, Wendlingen; Klaus-Jürgen Marquardt, Remshalden; Michael Hoffmann, Weistadt, all of Germany

[73] Assignee: Mercedes-Benz AG, Stuttgart, Germany

[21] Appl. No.: 518,506

[22] Filed: Aug. 23, 1995

[30] Foreign Application Priority Data

Aug. 23, 1994 [DE] Germany .......................... 44 29 855.2

[51] Int. Cl.⁶ ............................................. F02B 37/10
[52] U.S. Cl. ............................................. 60/607; 60/624
[58] Field of Search ........................... 60/607, 608, 624

[56] References Cited

U.S. PATENT DOCUMENTS

| | | |
|---|---|---|
| 2,197,179 | 4/1940 | Hersey . |
| 2,585,968 | 2/1952 | Schneider ............................ 60/608 |
| 5,033,269 | 7/1991 | Smith . |

FOREIGN PATENT DOCUMENTS

| | | | |
|---|---|---|---|
| 124981 | 4/1946 | Australia ........................... 60/607 |
| 649560 | 8/1937 | Germany . |
| 859238 | 12/1952 | Germany ........................... 60/607 |
| 1027941 | 4/1958 | Germany ........................... 60/607 |
| 3224006A1 | 12/1983 | Germany . |
| 3804013A1 | 2/1989 | Germany . |
| 3741286A1 | 3/1989 | Germany . |
| 63310167 | 6/1990 | Japan . |
| 877099 | 10/1981 | U.S.S.R. ........................... 60/607 |
| 1 332 051 A1 | 8/1987 | U.S.S.R. . |
| 206845 | 2/1924 | United Kingdom ............... 60/607 |
| 820096 | 9/1959 | United Kingdom . |
| 856788 | 12/1960 | United Kingdom . |
| 2080432 | 2/1982 | United Kingdom . |

*Primary Examiner*—Michael Koczo
*Attorney, Agent, or Firm*—Evenson, McKeown, Edwards & Lenahan P.L.L.C.

[57] ABSTRACT

A supercharged internal combustion engine has an exhaust gas turbocharger which includes an exhaust gas turbine and a compressor. The exhaust gas turbine and the compressor are connected to a turbocharger shaft and an appliance for the transmission of power for the purpose of a mechanical step-up drive capability for the exhaust gas turbocharger arranged between the turbocharger shaft and the crankshaft of the internal combustion engine. The appliance includes at least one step-up gear and a controllable hydrodynamic coupling for torque transmission arranged between the crankshaft and the turbocharger shaft. In order to configure the internal combustion engine in a simple and compact constructional manner in such a way that a better increase in torque of the internal combustion engine can be achieved in the lower rotational speed range by the mechanical step-up drive of the exhaust gas turbocharger and to achieve substantially shorter response times during transient operation of the internal combustion engine, the hydrodynamic coupling can be locked up by a mechanical or electro-mechanical clutch and is arranged between the step-up gear and the crankshaft of the internal combustion engine.

16 Claims, 2 Drawing Sheets

SUPERCHARGED INTERNAL COMBUSTION ENGINE WITH CAPABILITY FOR MECHANICAL STEP-UP DRIVE OF AN EXHAUST GAS TURBOCHARGER

BACKGROUND AND SUMMARY OF THE INVENTION

The invention relates to a supercharged internal combustion engine comprising an exhaust gas turbocharger which includes an exhaust gas turbine and a charge air compressor, the exhaust gas turbine and the charge air compressor being connected to a turbocharger shaft, an appliance for the transmission of power for the purpose of a mechanical step-up drive capability for the exhaust gas turbocharger being arranged between the turbocharger shaft and a crankshaft of the internal combustion engine, the appliance including at least one step-up gear and a controllable hydrodynamic coupling for torque transmission.

From German Patent Document DE 32 24 006 A1, a supercharged internal combustion engine of the generic type is already known which has an exhaust gas turbocharger with charge air cooling and an appliance for the transmission of power from the crankshaft of the internal combustion engine to the exhaust gas turbocharger. The appliance is used to provide a mechanical step-up drive capability for the exhaust gas turbocharger and includes a gear train and a controllable hydrodynamic coupling which is arranged after a step-up gear on the turbocharger shaft. Surplus power of the exhaust gas turbine can be transmitted to the crankshaft by means of the appliance. Acceleration nozzles in the exhaust gas conduit and power-saving swirl throttles at inlet to the compressor are used to optimize the operational behavior of the exhaust gas turbocharger.

Reference should also be made to U.S. Pat. No. 5,033,269 and British Patent Document GB 2 080 432 A for further general technical background on which the invention is based.

A disadvantage of supercharged internal combustion engines of the generic type lies in the fact that it is not possible to achieve a rotational speed of the exhaust gas turbocharger which is sufficiently high to provide an adequate supply of charge air at low rotational speeds of the internal combustion engine because the hydrodynamic coupling is arranged after the step-up gear on the turbocharger shaft and, in consequence, the only possible overall step-up gear characteristic is one in which the limiting rotational speed of the step-up gear is achieved only at maximum engine rotational speed.

During transient operation of the internal combustion engine (when accelerating the engine rapidly, for example), there is the additional problem that very short response times of the coupling between the crankshaft and the step-up gear may be necessary and these cannot be achieved because of the filling and emptying times of the hydrodynamic coupling in the arrangement in accordance with the generic prior art.

An object of the present invention is to configure an internal combustion engine of the generic type in a simple and compact constructional manner in such a way that a better increase in torque of the internal combustion engine can be achieved in the lower rotational speed range by the mechanical step-up drive of the exhaust gas turbocharger and that, in addition, substantially shorter response times can be achieved during transient operation of the internal combustion engine.

The invention achieves these objects by providing an arrangement of the above-described general type, wherein the hydrodynamic coupling is arranged between the step-up gear and the crankshaft of the internal combustion engine, and wherein a clutch is provided for selectively locking up the hydrodynamic coupling.

One advantage of the arrangement according to preferred embodiments of the invention relates to the fact that a very high step-up gear transmission ratio can be achieved by arranging the hydrodynamic coupling between the step-up gear and the crankshaft. Thus, very high rotational speeds of the charge air compressor (or of the exhaust gas turbocharger) can be achieved even at low rotational speeds of the internal combustion engine. A decisive feature is that an excessive rotational speed of the step-up gear can be avoided at higher rotational speeds of the internal combustion engine by emptying the hydrodynamic coupling.

A further advantage of the invention is that the hydrodynamic coupling can be locked up by a mechanical or electro-mechanical clutch. This permits realization of response times which are substantially shorter than the minimum response times determined by the filling and emptying of the hydrodynamic coupling. This is particularly advantageous when the internal combustion engine is accelerated rapidly.

The design according to certain preferred embodiments of the invention permits a matched two-speed gearbox to be used to select the transmission ratios of the gears in such a way that in the first gear, a very high rotational speed of the exhaust gas turbocharger and therefore a relatively high charge air pressure can be achieved even at low rotational speeds of the internal combustion engine without the limiting rotational speed of the step-up gear being exceeded. A gearbox first gear designed in this way, furthermore, permits optimization of the supercharger rotational speed with increasing rotational speed of the internal combustion engine by emptying the hydrodynamic coupling to the point where the exhaust gas turbocharger freewheels or runs independently. In the second gear, the transmission ratio is selected in such a way that the limiting rotational speed of the exhaust gas turbocharger and the step-up gear is reached only at the maximum rotational speed of the internal combustion engine, which lies above the rated rotational speed.

The design according to certain preferred embodiments of the invention permits the exhaust gas turbine to be initially decoupled from the charge air compressor at low rotational speed of the internal combustion engine so that the mechanical step-up gear only has to drive the charge air compressor and the moment of inertia of the turbine does not have to be overcome as well. At higher rotational speed of the internal combustion engine, the exhaust gas turbine is accelerated by the flow of exhaust gas and, at a specified rotational speed, it is coupled onto the turbocharger shaft by the clutch (a centrifugal clutch, for example).

Other objects, advantages and novel features of the present invention will become apparent from the following detailed description of the invention when considered in conjunction with the accompanying drawings.

DETAILED DESCRIPTION OF THE INVENTION

Figure 1:
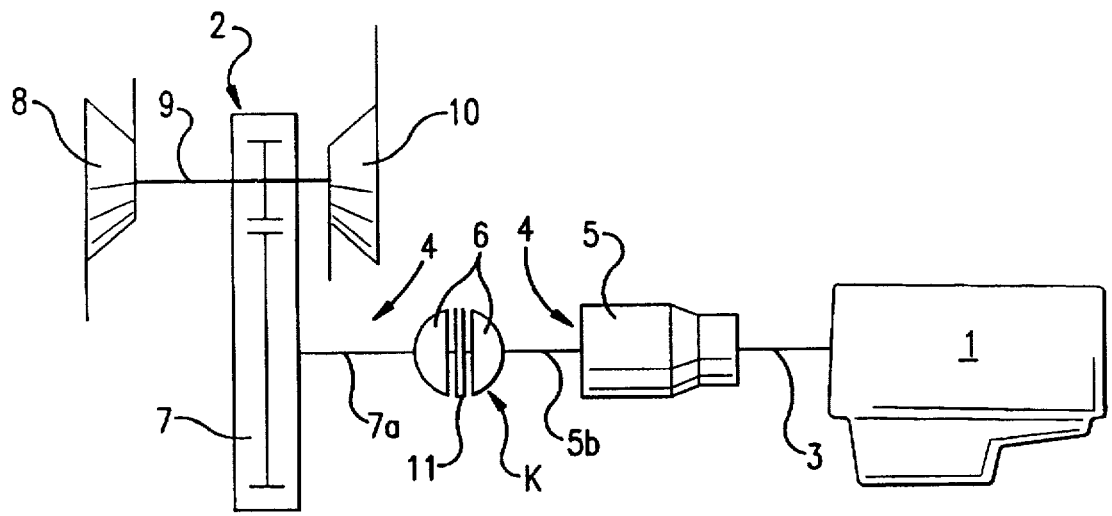
FIG. 1 is a schematic depiction of a supercharged internal combustion engine constructed according to a first preferred embodiment of the invention with a mechanical step-up drive capability for an exhaust gas turbocharger, a two-speed gearbox, a hydrodynamic coupling which can be locked up mechanically and a step-up gear being arranged between the crankshaft of the internal combustion engine and the exhaust gas turbocharger.
Figure 2:
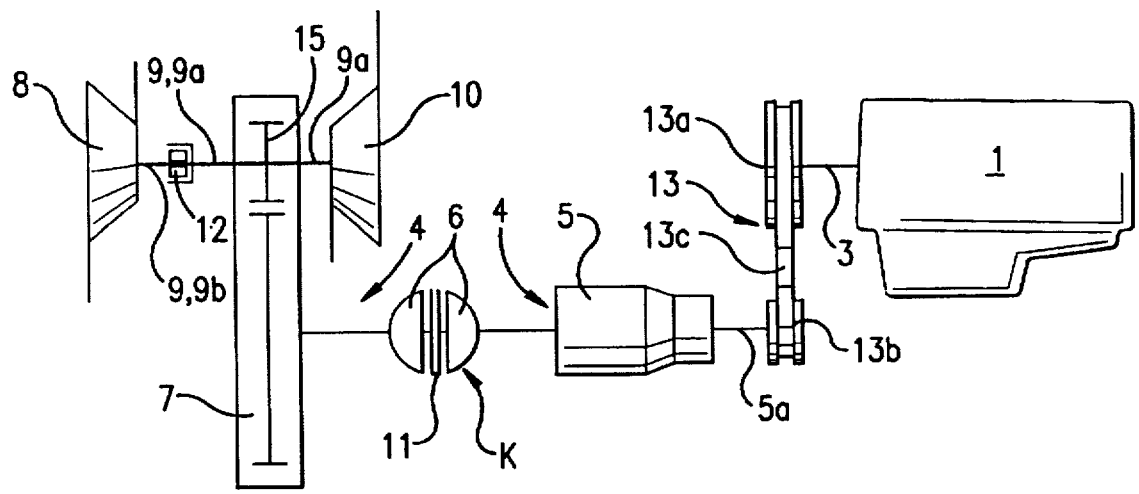
FIG. 2 is a schematic depiction, similar to FIG. 1, showing a second embodiment of the invention, with a centrifugal clutch arranged on the turbocharger shaft between the step-up gear and the turbine of the exhaust gas turbocharger.

FIGS. 1 and 2 are diagrammatic drawings showing a supercharged, air-compressing internal combustion engine 1 (engine) with a mechanical step-up drive capability for an exhaust gas turbocharger 2. An appliance 4 for the transmission of power is arranged between the crankshaft 3 of the internal combustion engine 1 and the exhaust gas turbocharger 2 and this appliance includes a two-stage change-speed gearbox 5, a controllable hydrodynamic coupling 6 which can be locked up mechanically, and a step-up gear 7.

The exhaust gas turbocharger 2 includes an exhaust gas turbine 8 which is connected to a charge air compressor 10 by a turbocharger shaft 9.

The hydrodynamic coupling 6 can be locked up by a mechanical clutch 11 so that the selection procedures can be effected in very short times—during rapid acceleration of the internal combustion engine for example. The hydrodynamic coupling 6 and the mechanical clutch 11 form a coupling unit K which is arranged between the step-up gear 7 and the crankshaft 3 of the internal combustion engine 1.

The coupling unit K is constructed in such a way that the mechanical clutch 11 can connect together an output shaft 5b of the change-speed gearbox 5 and an input shaft 7a of the step-up gear 7 in a very short time (approximately 0.2–0.4 seconds) and independently of the filling ratio of the hydrodynamic coupling 6. When the hydrodynamic coupling 6 has been emptied and the mechanical clutch 11 is closed, the connection between the drive and the step-up gear 7 can be very rapidly released by opening the mechanical clutch 11. In a preferred structural design of the coupling unit K, the mechanical clutch 11 is arranged within the hydrodynamic coupling 6.

The two-stage change-speed gearbox 5 is arranged, viewed from the crankshaft 3, before the coupling unit Ks which is in turn located before the step-up gear 7.

The gear stages of the two-stage change-speed gearbox 5 are matched in such a way that a rotational speed $na_{LU}$ (see FIG. 4) of the exhaust gas turbocharger 2 which is near the limiting rotational speed $n_g$ of the step-up gear 7 can be achieved with the first gear of the change-speed gearbox 5 even at low rotational speed of the internal combustion engine 1 (engine rotational speed) so that the exhaust gas turbocharger 2 delivers a relatively high charge air pressure even at low engine rotational speed n. The second gear $g_2$ is chosen is such a way that the limiting rotational speed $n_g$ of the step-up gear 7 and the exhaust gas turbocharger 2 are reached only at the maximum rotational speed $n_{max}$ of the engine. The transmission ratio of the step-up gear 7 is located in a range between 10:1 and 20:1, preferably at approximately 15:1.

In FIG. 2, the exhaust gas turbine 8 and the charge air compressor 10 are connected by a clutch 12 for example a centrifugal clutch) arranged on the turbocharger shaft 9 between the step-up gear 7 and the exhaust gas turbine 8. In this design, the turbine shaft assembly 9 consists of a compressor shaft 9a and a turbine shaft 9b which can be connected together by means of the clutch 12. A belt drive 13 with a crankshaft-end belt pulley 13a, an input shaft-end belt pulley 13b and a V-belt 13c is arranged between the crankshaft 3 and the input shaft 5a of the change-speed gearbox 5. The transmission ratio of the belt drive 13 from the crankshaft 3 to the input shaft 5a is approximately between 2:1 and 4:1.

In the design in accordance with FIG. 2, the exhaust gas turbine 8 is driven only by the exhaust gas flow of the internal combustion engine 1 when the engine is being accelerated with the charge air compressor 10 mechanically driven and the clutch 12 disengaged. With increasing engine rotational speed n, the exhaust gas turbine 8 overtakes the mechanical drive and the clutch 12 connects together the turbine shaft 9b and the compressor shaft 9a of the turbocharger shaft 9 at a specified rotational speed of the turbine shaft 9b.

Figure 3:
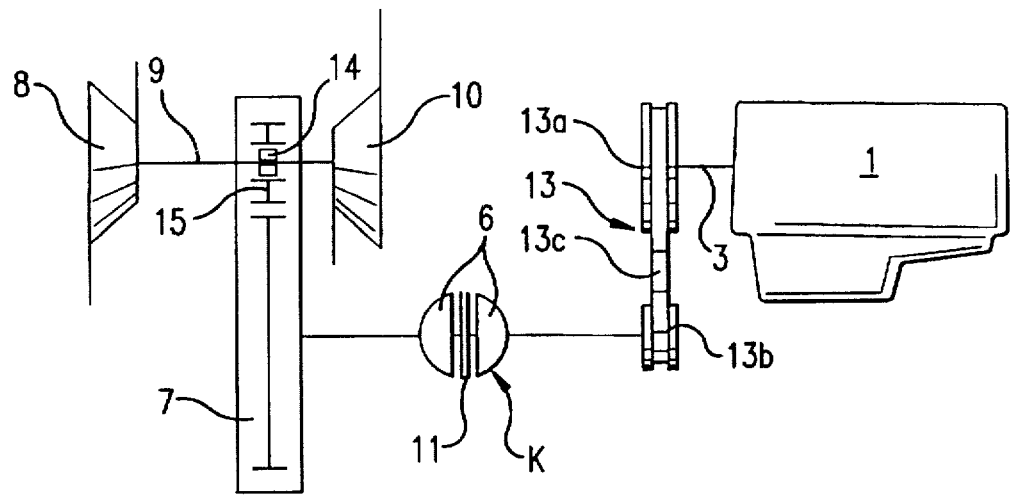
FIG. 3 is a schematic depiction, similar to FIG. 1, showing a third embodiment of the invention, with a selectable step-up gear freewheel arranged on the turbocharger shaft, but without the two-stage change-speed gearbox.

In FIG. 3, the step-up gear 7 for the turbocharger shaft 9 has a free-wheel 14 for the purpose of disconnecting the mechanical drive, the free-wheel 14 being arranged on the pinion 15 of the step-up gear 7. This pinion 15 is seated on the turbocharger shaft 9. The same reference signs are used for components which are the same as those in FIGS. 1 and 2. The dynamic response of the exhaust gas turbocharger 2 is increased by the free-wheel when the drive is not being supported because the additional masses of the step-up gear 7 and the hydrodynamic coupling 6 do not have to be accelerated by the exhaust gas turbocharger 2. In this design, it is not possible to reduce the rotational speed of the exhaust gas turbocharger 2 so the changespeed gearbox is omitted in this case. Turbo-compound operation is not possible with this variant.

Figure 4:
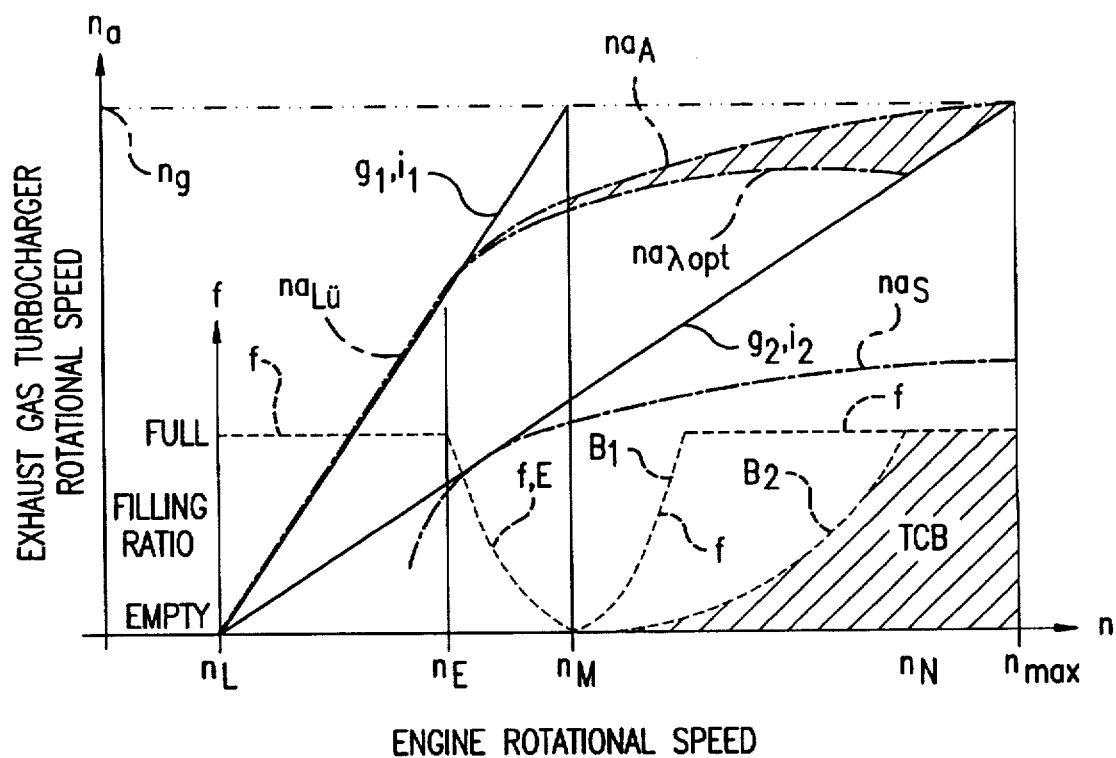
FIG. 4 shows a diagram in which the respective filling ratios for the hydrodynamic coupling and the associated rotational speed of the exhaust gas turbocharger are plotted as a function of the engine rotational speed and the gear selected for the two-stage change-speed gearbox.

The function and mode of operation of the invention are explained below using the diagram shown in FIG. 4, in which the qualitative relationship is represented between the engine rotational speed n, the overall transmission ratio i (depending on the gear g selected in the two-stage change-speed gearbox 5), the respective filling ratio f of the hydrodynamic coupling 6 and the associated rotational speed na of the exhaust gas turbocharger 2. The same reference signs as in FIGS. 1 to 3 are used when referring to the individual components. The engine rotational speed n is qualitatively plotted on the abscissa of FIG. 4 and the rotational speed na of the exhaust gas turbocharger 2 and the filling ratio f of the hydrodynamic coupling 6 are qualitatively plotted on the ordinate.

The respective gears g ($g_1$, $g_2$) of the changespeed gearbox 5 are shown as full lines in the diagram, the filling ratio f of the hydrodynamic coupling 6 is shown by an interrupted line, the rotational speeds na, $na_{LU}$, $na_r$ and $na_A$ of the exhaust gas turbocharger 2 are shown chain-dotted, the turbo-compound operation region TCB is shown shaded and the limiting rotational speed $n_g$ of the step-up gear 7 is shown chain-dotted with double dots.

The values $i_1$ and $i_2$ refer to the respective overall transmission ratios i ($i_1$, $i_2$) of the appliance 4 for the transmission of power, i.e., the respective overall transmission ratio i from the crankshaft 3 to the turbocharger shaft 9 for the gear $g_1$, $g_2$ selected in the change-speed gearbox 5. The matching of rotational speed of the exhaust gas turbocharger 2 or the transition to exhaust gas turbocharger operation is ensured by controlled emptying (emptying curve E) of the hydrodynamic coupling 6.

When the exhaust gas turbocharger 2 is freewheeling, i.e., it is driven only by the exhaust gas energy of the engine, its acceleration takes place in a delayed manner during acceleration of the engine because, inter alia, of the rotating masses to be accelerated. In the case of supported supercharging, the exhaust gas turbocharger 2 (rotational speed $n_{LU}$) is mechanically connected to the engine by means of the first gear $g_1$ of the change-speed gearbox 5, the coupling unit K (filled hydrodynamic coupling 6 and closed mechanical clutch 11) and the step-up gear 7 in the lower engine rotational speed range and during acceleration. The exhaust gas turbocharger can therefore build up the charge pressure necessary for the acceleration of the engine. Shortly before the limiting rotational speed $n_g$ of the exhaust gas turbocharger 2 is reached, the latter is separated from the engine by the opening of the mechanical clutch 11 and the stepless emptying of the hydrodynamic coupling 6.

Emptying (emptying curve E) begins at a specified engine rotational speed $n_E$ and is concluded at a specified engine rotational speed $n_M$ ($n_E < n_M$, $n_M$ approximately 1000–1200 rpm) When the hydrodynamic coupling 6 has been emptied and the mechanical clutch 11 is open, the change-speed gearbox 5 is changed into the second gear $g_2$ ($i_2$ approximately equal to 50) at While the hydrodynamic coupling 6 remains empty and the mechanical clutch 11 is opened, the exhaust gas turbocharger then rotates at the rotational speed $na_A$ determined by the energy of the exhaust gas. When the hydrodynamic coupling 6 is full or partially full, the rotational speed na of the exhaust gas turbocharger 2 also, of course, depends on the load applied by means of the step-up gear 7.

For gentle transition from mechanical (or exhaust gas operated hydraulic-mechanical) drive to drive of the exhaust gas operated drive of the turbocharger 2, the latter and the transmission ratio of the gears $g_1$ and $g_2$ must be appropriately matched. The gentle transition is supported by the moment of inertia of the rotating parts after the hydrodynamic coupling 6.

If the energy of the rotating masses is not sufficient to keep the exhaust gas turbocharger 2 at its rotational speed, the latter can be accelerated again by briefly closing the mechanical clutch 11. This also applies to the subsequent selection procedures even if, in these cases, the rotational speed of the exhaust gas turbocharger 2 (FIG. 1) or of the charge air compressor 10 (FIG. 2) specified by the drive transmission ratio is exceeded. In this case, however, the drive must take place via the clutch 11 slipping for a short period.

In the normal operating case (the main driving range), the internal combustion engine 1 should preferably run with the gear g2 selected in the change-speed gearbox 5 and with the exhaust gas turbocharger 2 driven by exhaust gas only. By this means, the exhaust gas turbocharger rotational speed na can be matched to the requirements of the engine in the medium to high rotational speed range of the latter over the entire engine characteristic diagram by means of the second gear $g_2$ of the change-speed gearbox 5 and by partial filling of the hydrodynamic coupling 6 with the mechanical clutch 11 disengaged.

The partial filling permits the supercharger rotational speed, and therefore the air supply for the engine (an air-compressing internal combustion engine in the present case) to be set to the optimum air/fuel ratio $\lambda (\lambda \gg 1)$ of the engine for optimum power output at the best consumption. The surplus energy from the turbine in this range is supplied as mechanical energy to the engine via the power transmission device 4. In coasting operation of the engine, a correspondingly low rotational speed range of the exhaust gas turbocharger 2 is also achieved because there is less exhaust gas energy.

In engine braking operation, with the usually high engine rotational speed and the second gear $g_2$ of the change-speed gearbox selected ($i_2$ approximately 50), the hydrodynamic coupling 6 has to be filled on actuation of the braking flap and/or operational brake (filling curves $B_1$ and $B_2$); the filling ratio of the hydrodynamic coupling 6 can also contribute to the determination of the braking power of the engine. A very high braking power in excess of the nominal engine power can be achieved by means of the compressor power taken up and by the high engine charge. The high engine braking power which can be achieved in engine braking operation by controlled filling of the hydrodynamic coupling 6 is achieved, on the one hand, because the full compressor power can be utilized as braking power and on the other hand, because the engine is provided with the highest possible quantity of air. The latter can be converted into a high engine braking power by means of the braking flap and/or a decompression device (a decompression valve, for example). The overall transmission ratio $i_2$ in the second gear stage $g_2$ of the change-speed gearbox 5 is selected in such a way that the limiting rotational speed $n_g$ of the exhaust gas turbocharger 2 and the step-up gear 7 is only reached at the maximum speed of the engine for braking operation; this is usually markedly higher than the nominal rotational speed $n_N$.

Engine braking operation is, of course, also possible in the first gear stage $g_1$. When the first gear stage $g_1$ is selected, control of the rotational speed na of the exhaust gas turbocharger 2 is possible up to the limiting rotational speed $n_g$ of the exhaust gas turbocharger 2 and the step-up gear 7. The maximum rotational speed of the engine for braking operation is not then possible, of course, because of the selection, described above, of $i_2$ and $g_2$.

Furthermore, turbo-compound operation is possible with the arrangement according to the invention by feeding in the surplus power of the exhaust gas turbine 8 of the exhaust gas turbocharger 2 due to "retardation" of the exhaust gas turbocharger 2 in the second gear stage $g_2$ of the change-speed gearbox 5 (shaded region in the diagram).

To suit appropriate selection strategies, the filling ratio f and therefore the slip of the hydrodynamic coupling 6, which is fed from the engine oil circuit, can be steplessly varied to limit the rotational speed $n_a$ of the exhaust gas turbocharger 2 and in order to feed the turbine power not required into the engine or in order to mechanically drive the charge air compressor 10 in engine braking operation.

Furthermore, $\lambda$ control is also possible. Unnecessary large $\lambda$ values and pressure ratios occur in the upper full-load rotational speed range due to the usually excessive turbine power. The charge air supplied can be set to $\lambda$ values which are optimum for the engine and the surplus turbine power can be surplus crankshaft 3 by gas turbocharger 2 (rotational speed $na_{\lambda\text{-}opt}$), supplied to the controlled retardation of the exhaust and the In a further design of the invention, an electromechanical clutch can be used instead of the mechanical clutch for locking up the hydrodynamic coupling.

In addition, the belt drive described in the illustrated embodiments can be replaced by a gearwheel drive with appropriate center line offset compensation. The transmission ratio of such a gearwheel drive between the crankshaft and the input shaft is, in a manner analogous to the belt drive, approximately between 2:1 and 4:1.

Furthermore, the invention also relates to mixture-compressing internal in an analogous manner according to other contemplated embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Supercharged internal combustion engine comprising:
   an exhaust gas turbocharger which includes an exhaust gas turbine and a charge air compressor, the exhaust gas turbine and the charge air compressor being connected to a turbocharger shaft,
   an appliance for the transmission of power for the purpose of a mechanical step-up drive capability for the exhaust gas turbocharger being arranged between the turbocharger shaft and a crankshaft of the internal combustion engine, the appliance including at least one step-up gear and a controllable hydrodynamic coupling for torque transmission,
   wherein the hydrodynamic coupling is arranged between the step-up gear and the crankshaft of the internal combustion engine, and
   wherein a clutch is provided for selectively locking up the hydrodynamic coupling.

2. Supercharged internal combustion engine according to claim 1, wherein the exhaust gas turbine and the charge air compressor are connected by a clutch arranged on the turbocharger shaft between the step-up gear and the exhaust gas turbine.

3. Supercharged internal combustion engine according to claim 2, wherein the clutch is a centrifugal clutch.

4. Supercharged internal combustion engine according to claim 1, wherein the step-up gear has a free-wheel for the turbocharger shaft for the purpose of disconnecting the mechanical drive.

5. Supercharged internal combustion engine according to claim 1, wherein the step-up gear for the turbocharger shaft has a free-wheel for the purpose of disconnecting the mechanical drive.

6. Supercharged internal combustion engine according to claim 1, wherein a belt drive is arranged between the change-speed gearbox and the crankshaft.

7. Supercharged internal combustion engine according to claim 1, wherein a gearwheel drive is arranged between the change-speed gearbox and the crankshaft.

8. Supercharged internal combustion engine according to claim 1, wherein the exhaust gas turbocharger can be retarded at least until a specified λ value is reached for the purpose of λ control of the internal combustion engine by controlled refilling of the hydrodynamic coupling, the surplus power of the exhaust gas turbine being transmittable to the crankshaft.

9. Supercharged internal combustion engine according to claim 1, wherein in order to achieve a high engine braking effect at high engine rotational speeds, the exhaust gas turbocharger is connected to the crankshaft in the second gear of the change-speed gearbox and the filling of the hydrodynamic coupling can be controlled as a function of a desired engine braking power.

10. Supercharged internal combustion engine comprising:
    an exhaust gas turbocharger which includes an exhaust gas turbine and a charge air compressor, the exhaust gas turbine and the charge air compressor being connected to a turbocharger shaft,
    an appliance for the transmission of power for the purpose of a mechanical step-up drive capability for the exhaust gas turbocharger being arranged between the turbocharger shaft and a crankshaft of the internal combustion engine, the appliance including at least one step-up gear and a controllable hydrodynamic coupling for torque transmission,
    wherein the hydrodynamic coupling is arranged between the step-up gear and the crankshaft of the internal combustion engine, and
    wherein a clutch is provided for selectively locking up the hydrodynamic coupling, wherein the hydrodynamic coupling, viewed from the crankshaft, is arranged after a change-speed gearbox which is connected to the crankshaft and has at least two transmission ratios, and before the step-up gear.

11. Supercharged internal combustion engine according to claim 10, wherein the step-up gear has a limiting rotational speed, the exhaust gas turbocharger has a limiting rotational speed, and the internal combustion engine has a maximum rotational speed, and wherein the gear stages of the two-stage change-speed gearbox are chosen in such a way that, in the first gear, the limiting rotational speeds of the step-up gear and of the exhaust gas turbocharger are reached at a low rotational speed of the internal combustion engine and, in the second gear, the limiting rotational speed of the step-up gear and the exhaust gas turbocharger are reached at the maximum rotational speed of the internal combustion engine.

12. Supercharged internal combustion engine according to claim 3, wherein the step-up gear has a transmission ratio in the range between 10:1 and 20:1.

13. Supercharged internal combustion engine according to claim 10, wherein the exhaust gas turbine and the charge air compressor are connected by a clutch arranged on the turbocharger shaft between the step-up gear and the exhaust gas turbine.

14. Supercharged internal combustion engine according to claim 13, wherein the clutch is a centrifugal clutch.

15. Supercharged internal combustion engine according to claim 11, wherein the exhaust gas turbine and the charge air compressor are connected by a clutch arranged on the turbocharger shaft between the step-up gear and the exhaust gas turbine.

16. Supercharged internal combustion engine according to claim 15, wherein the clutch is a centrifugal clutch.

* * * * *